(12) United States Patent
Chen et al.

(10) Patent No.: US 6,684,155 B1
(45) Date of Patent: Jan. 27, 2004

(54) VEHICLE MANAGEMENT SYSTEM

(75) Inventors: Kuo-Rong Chen, Panchiao (TW);
Chun-Chung Lee, Taipei (TW);
Cheng-Hung Huang, Miaoli Hsien (TW)

(73) Assignee: Sin Etke Technology Co., Ltd., Taipei (TW)

( * ) Notice: Subject to any disclaimer, the term of this patent is extended or adjusted under 35 U.S.C. 154(b) by 0 days.

(21) Appl. No.: 10/357,366

(22) Filed: Feb. 4, 2003

(30) Foreign Application Priority Data

Oct. 28, 2002 (TW) ........................ 91132006 A

(51) Int. Cl.[7] .......................... H04Q 7/20; G06F 165/00
(52) U.S. Cl. .................... 701/117; 701/206; 340/995.2; 340/995.22; 455/456.1
(58) Field of Search ................................ 701/117, 200, 701/206, 207, 209, 211, 213, 214, 26; 73/178 R; 340/988, 995.13, 995.19, 995.2, 995.22, 995.23, 995.24, 995.25; 455/456.1, 404.2

(56) References Cited

U.S. PATENT DOCUMENTS 6,507,785 B1 * 1/2003 Stefan et al. ................ 701/210
6,611,788 B1 * 8/2003 Hussa ........................ 702/160
6,640,106 B2 * 10/2003 Gutowski et al. ......... 455/456.1

* cited by examiner

*Primary Examiner*—William A Cuchlinski, Jr.
*Assistant Examiner*—Olga Hernandez
(74) *Attorney, Agent, or Firm*—Bacon & Thomas, PLLC

(57) ABSTRACT

A vehicle management system is disclosed to have GPS coordinates of a plurality of checkpoints of entrance gateways and exit gateways of a freeway stored in the memory of a vehicle. When a driver drives in an entrance gateway (or out of an exit gateway) of the freeway and an on-vehicle processor of the vehicle compares the current GPS coordinates of the vehicle to be matched with GPS coordinates of one entrance (exit) checkpoint stored in the memory, the on-vehicle processor controls a wireless communication device to wirelessly send the code number of the corresponding entrance (exit) and the license number of the vehicle to a remote control center for log-in (log-out). According to the log-in/log-out data, the control center can control the traffic volume, electronic toll collection, stolen car tracking, or motorcade, . . . and etc. of the freeway.

20 Claims, 5 Drawing Sheets

| Name of road | Name of checkpoint | GPS coordinates | Entrance/exit ID information | |
|---|---|---|---|---|
| Northward entrance $A_1$ | Checkpoint $A_{11}$<br>Checkpoint $A_{12}$<br>Checkpoint $A_{13}$<br>Checkpoint $A_{14}$ | $(X_{11}, Y_{11}, Z_{11})$<br>$(X_{12}, Y_{12}, Z_{12})$<br>$(X_{13}, Y_{13}, Z_{13})$<br>$(X_{14}, Y_{14}, Z_{14})$ | $NA_1$ | 192 Km |
| ......... | ......... | ......... | ......... | ......... |
| Northward exit $B_3$ | Checkpoint $B_{31}$<br>Checkpoint $B_{32}$<br>Checkpoint $B_{33}$<br>Checkpoint $B_{34}$ | $(X_{31}, Y_{31}, Z_{31})$<br>$(X_{32}, Y_{32}, Z_{32})$<br>$(X_{33}, Y_{33}, Z_{33})$<br>$(X_{34}, Y_{34}, Z_{34})$ | $NB_3$ | 128 Km |
| Northward road section $A_1A_2$ | Checkpoint $C_1$<br>Checkpoint $C_2$<br>Checkpoint $C_3$ | $(X_1, Y_1, Z_1)$<br>$(X_2, Y_2, Z_2)$<br>$(X_3, Y_3, Z_3)$ | $NA_1$ | 192 Km |
| ......... | ......... | ......... | ......... | ......... |

FIG. 4

| Exit\Entrance | NB1 | NB2 | NB3 | NB4 | NB5 | NB6 | NB7 | NB8 | NB9 |
|---|---|---|---|---|---|---|---|---|---|
| NA1 | | 1.2 | 2.0 | 2.6 | 3.2 | 3.7 | 4.2 | 4.6 | 5.0 |
| NA2 | | | 1.2 | 2.0 | 2.6 | 3.2 | 3.7 | 4.2 | 4.6 |
| NA3 | | | | 1.2 | 2.0 | 2.6 | 3.2 | 3.7 | 4.2 |
| NA4 | | | | | 1.2 | 2.0 | 2.6 | 3.2 | 3.7 |
| NA5 | | | | | | 1.2 | 2.0 | 2.6 | 3.2 |
| NA6 | | | | | | | 1.2 | 2.0 | 2.6 |
| NA7 | | | | | | | | 1.2 | 2.0 |
| NA8 | | | | | | | | | 1.2 |
| NA9 | | | | | | | | | |

FIG. 5

VEHICLE MANAGEMENT SYSTEM

BACKGROUND OF THE INVENTION

1. Field of the Invention

The present invention relates to a vehicle management system and, more particularly, to such a vehicle management system installed in a vehicle having a global positioning system and a wireless communication device. When the vehicle entered or moved away from a specific road (for example, a freeway, highway, toll bridge, . . . ), the on-vehicle wireless communication device logs in or out on a remote control center, for enabling the remote control center to achieve various management controls, including traffic volume controlling, ETC (electronic toll collection), stolen car tracking, motorcade managing, . . . and etc.

2. Description of Related Art

In a conventional freeway, solid toll stations are installed at a predetermined pitch along the way. When passing through a toll station, vehicle drivers must slow down the speed and pay the toll fee. This toll collection method affects traffic flow rate, and interferes with safety driving. Further, this manual toll collection method is of low efficiency.

Thereafter, infrared wireless electronic toll collection systems were developed. An infrared wireless electronic toll collection system is to install infrared transceivers in solid toll stations along the way, which infrared transceiver deduct the toll fee from the prepaid apparatus of the on-vehicle unit of the vehicle passed the solid toll station by means of an infrared transmission. The method of using an infrared wireless electronic toll collection system in a specific road to collect toll fee still hinders the traffic flow rate and driving safety because the solid toll station having infrared transceivers extends transversely across the freeway and vehicles must slow down the speed when passing the toll station. Building such solid toll stations across a specific road requires a big investment, and takes a long time. Further, it is neither reasonable nor convenient to ask vehicle owners to prepay money for the amount registered in the prepaid apparatus of the on-vehicle unit in advance. The high installation cost of the on-vehicle prepaid apparatus does not encourage vehicle owners to install.

There is known another freeway toll collection system, which requires a solid control station in every entrance gateway and a solid toll station in every exit gateway. Because too many solid control stations and solid toll stations are required to be managed, and the installation time is long, the management cost is high.

The aforesaid three prior art methods can only collect toll fee on vehicles running on the freeway. They do not provide any other management controls such as traffic volume control, stolen car tracking control, motorcade managing control . . . and etc.

Therefore, it is desirable to provide a vehicle management system that eliminates the aforesaid problems.

SUMMARY OF THE INVENTION

The main object of the present invention has been accomplished under the circumstances in view. It is the main object of the present invention to provide a vehicle management system, which is to be installed in vehicles for enabling a remote control center to execute various management controls on vehicles running on specific roads. It is another object of the present invention to provide a vehicle management system for installation in vehicles, which is used with global position information to set up an electronic toll collection system. To achieve these and other objects of the present invention, the vehicle management is installed in a vehicle, comprising a global positioning module adapted to compute a current position information of the vehicle; wireless communication means; memory means, the memory means having stored therein the global position information of at least one entrance checkpoint and at least one exit checkpoint; and processor means adapted to compare the current positions information of the vehicle to the global position information of the at least one entrance checkpoint and to control the wireless communication means to send an entrance information representing a matched entrance checkpoint and the identification code of the vehicle wirelessly to the remote control center for log-in when the comparison matched, the processor means also being adapted to compare the current position information of the vehicle to global position information of the at least one exit checkpoint and to control the wireless communication means to send an exit information representing a matched entrance checkpoint and the identification code of the vehicle wirelessly to the remote control center for log-out when the comparison matched. Subject to the long-in/log-out time and/or location information of vehicles on a specific road, the remote control center can execute a variety of management controls including traffic volume control, electronic toll collection control, stolen car tracking control, motorcade managing control, and etc. The present invention need not to install a solid toll station on the road so as to save the installation time and cost.

The remote control center can be made having a schedule rating database having stored therein a toll collection rating, so that the remote control center can compute the toll fee of every vehicle passing through the specific road according to the toll collection rating. The toll collection rating can be a schedule rating table or mileage based toll rating formula.

Theoretically, it needs only to compare the longitudinal and latitudinal coordinates when comparing the global position coordinates of every checkpoint. In order to improve the accuracy, a DGPS receiver may be added to the vehicle to receive. DGPS differential data from DGPS reference stations spread anywhere, so that the GPS module (or on-vehicle processor) of the vehicle can use the received differential data to proofread and to improve the current position coordinates of the vehicle accurately. The differential data can be collected in advance by the remote control center from DGPS reference stations anywhere, and then sent from the remote control center wirelessly to the wireless communication means of the vehicle in the way of short-message, digital broadcasting, . . . and etc.

The identification code of the vehicle can be the license number, engine number, ID card number of the vehicle owner, credit card number of the vehicle owner, bank account number of the vehicle owner, or any equivalent code number representative of the identity of the vehicle or the vehicle owner.

The global positioning module can be a GPS module. Alternatively, the positioning technique of using three mobile telephone base stations to identify a position, or any of a variety of equivalent global positioning techniques may be used.

The wireless communication means can be a GPRS module, GSM module, CDMA module, 3C module, blue tooth module, or any of a variety of equivalent wireless communication modules.

The memory means can be fixed on board such as a hard diskdrive, a memory card, a ROM, a RAM, or any of a variety of equivalent fixed memory devices. Preferably, the memory means is a flash memory card. The memory means can also be a removable floppy diskdrive, a removable memory card, or any of a variety of equivalent removable memory devices, preferably, a portable IC memory card.

Other objects, advantages, and novel features of an invention will become more apparent from the following detailed description when taken in conjunction with the accompanying drawings.

BRIEF DESCRIPTION OF THE DRAWINGS

FIG. 4 illustrates an example of the storage content of a memory device according to the preferred embodiment of the present invention.

FIG. 5 shows the content of a schedule rating table according to the preferred embodiment of the present invention.

DETAILED DESCRIPTION OF THE PREFERRED EMBODIMENT

Figure 1:
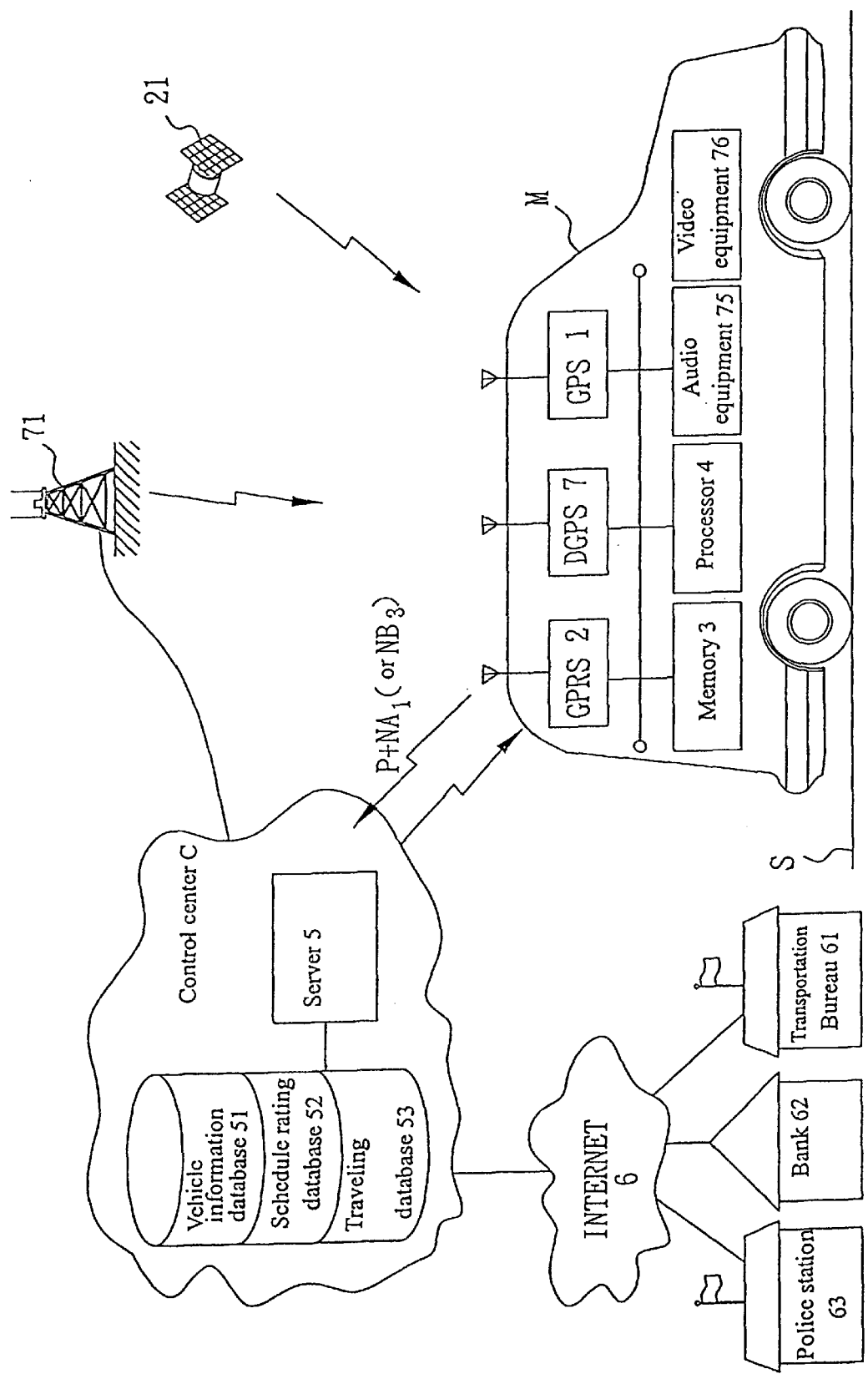
FIG. 1 illustrates the system architecture of an preferred embodiment of the present invention.

FIG. 1 illustrates a preferred embodiment of the present invention installed in a motor vehicle M. The motor vehicle M uses its license number P (the number of the license plate) for identification. According to the preferred embodiment of the present invention, a GPS (Global Positioning System) module 1 is provided inside the motor vehicle M for receiving global position signal from satellites 21 for calculating the current position coordinates (Xc, Yc, Zc) of the motor vehicle M. The motor vehicle M further has a GPRS (General Packet Radio Service) module 2 installed therein for wireless communication with a remote control center C, and a high capacity IC memory card type memory device 3 for data storage. Because the memory device 3 uses a high capacity IC memory card for storing data, the user can carry the memory card away from the motor vehicle M to a maintenance center for replacement or updating content, or to the home for connection to the Internet to download the updating content.

Figure 2:
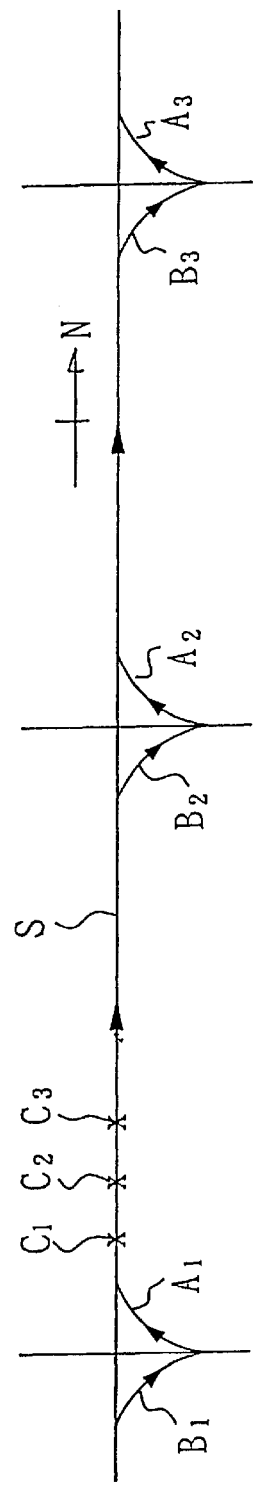
FIG. 2 is a bird's view showing the application of the preferred embodiment of the present invention in a freeway.

Referring to FIG. 2, the specific road to be managed in this embodiment is a freeway S. For easy explanation of this embodiment, FIG. 2 shows only the northward line. The freeway S has multiple entrance gateways $A_1, A_2, A_3, \ldots$ etc. along the way, and multiple exit gateways $B_1, B_2, B_3, \ldots$ etc.

Figure 3:
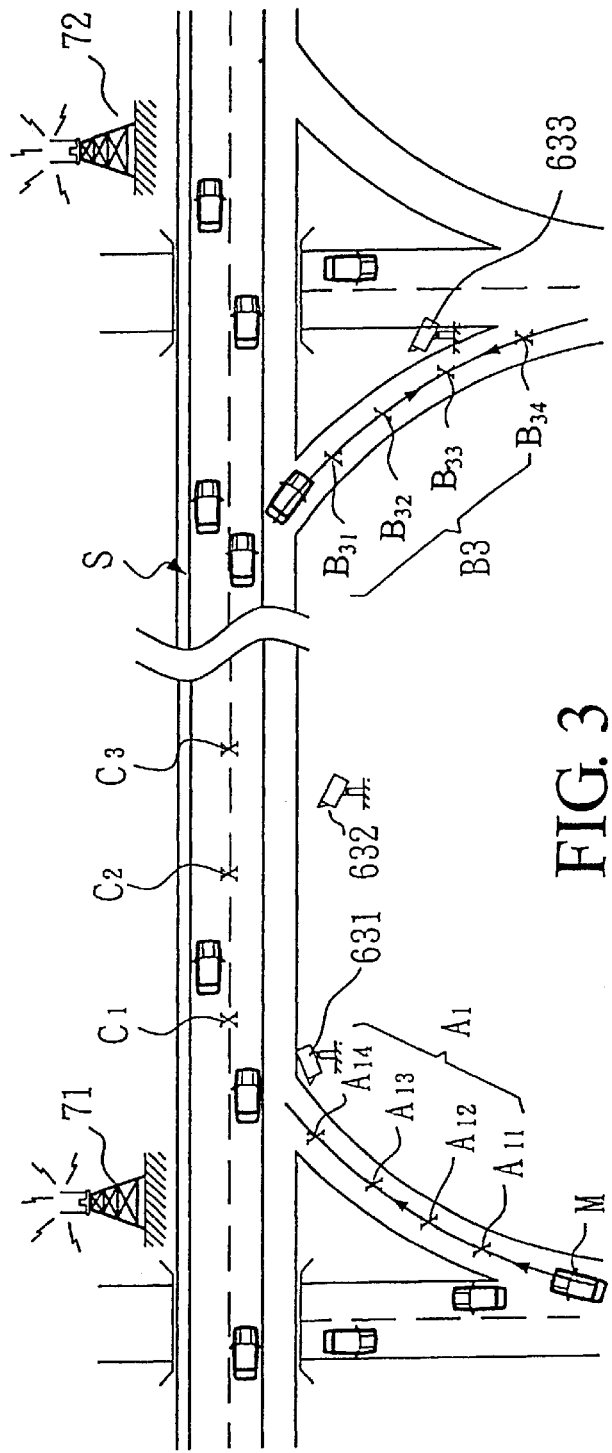
FIG. 3 is an enlarge view of FIG. 2 showing the application of the preferred embodiment of the present invention in the entrance/exit gateways of the aforesaid freeway.

FIG. 3 is an enlarged view of one entrance gateway $A_1$, and one exit gateway $B_1$, of the freeway S. The entrance gateway $A_1$ has been pre-defined four entrance checkpoints $A_{11}, A_{12}, A_{13}$, and $A_{14}$ respectively spaced from one another at a predetermined interval. The exit gateway $B_3$ has been pre-defined four exit checkpoints $B_{31}, B_{32}, B_{33}$, and $B_{34}$ respectively spaced from one another at a predetermined interval. The respective global position coordinates of the entrance checkpoints $A_{11}, A_{12}, A_{13}$, and $A_{14}$ and exit checkpoints $B_{31}, B_{32}, B_{33}$, and $B_{34}$ are measured in advance and stored in the portable IC memory card of memory device 3 of the motor vehicle M. The license number P of the motor vehicle M is also stored in the memory device 3 for identification of the vehicle M.

Referring to FIG. 4, the memory device 3 has also stored therein data concerning the corresponding relationship between every entrance/exit checkpoint and the corresponding entrance/exit ID information, for example, entrance checkpoints $A_{11}, A_{12}, A_{13}$, and $A_{14}$ correspond to entrance ID "$NA_1$" that represents "Northward entrance gateway No. $A_1$, and exit checkpoints $B_{31}, B_{32}, B_{33}$, and $B_{34}$ correspond to exit ID "$NB_3$" that represents "Northward exit gateway No. $B_3$. FIG. 4 also shows another content of the entrance/exit gateway. According to this embodiment, the another content of the entrance/exit gateway contains entrance/exit gateway mileage, or global position coordinates of every entrance/exit checkpoint. Any other equivalent information for identification of each entrance/exit gateway may be adopted.

Referring to FIG. 1 again, the motor vehicle M further has a processor 4 installed therein for fetching the current position coordinates (Xc, Yc, Zc) of the motor vehicle M from the GPS module 1 for comparing to the global position coordinates of every entrance/exit checkpoint stored in the memory device 3.

Referring to FIG. 3, when entering the freeway S through the entrance gateway $A_1$, the motor vehicle M must pass through the entrance checkpoint $A_{11}, A_{12}, A_{13}$, and $A_{14}$. Therefore, if the on-vehicle processor 4 identified that the current position coordinates (Xc, Yc, Zc) of the motor vehicle M matches the global position coordinates of one of the four entrance checkpoints $A_{11}, A_{12}, A_{13}$, and $A_{14}$, it means that the motor vehicle M is driving into the entrance gateway $A_1$; if the processor 4 "continuously" identified that the current position coordinates (Xc, Yc, Zc) of the motor vehicle M matches the global position coordinates of two, three, or all of the four entrance checkpoints $A_{11}, A_{12}, A_{13}$, and $A_{14}$, it assures the motor vehicle M drives into the entrance gateway $A_1$. When the motor vehicle M confirmed driving into the entrance gateway $A_1$, the processor 4 reads in the entrance gateway ID number "$NA_1$" corresponding to the entrance checkpoints $A_{11}, A_{12}, A_{13}$, and $A_{14}$ from memory device 3, and controls the GPRS module 2 to send out a short message containing the entrance gateway ID number "$NA_1$" and the license number P of the motor vehicle M for log-in to the remote control center C. Upon receipt of the short message, the control center C immediately sends back a logged-in short message to activate the audio equipment 75 or video equipment 76 of the motor vehicle M, noticing the driver that the motor vehicle M has moved into the entrance gateway "$NA_1$" of the freeway S.

When entering the freeway S through the exit gateway $B_3$, the motor vehicle M must pass through the exit checkpoint $B_{31}, B_{32}, B_{33}$, and $B_{34}$. Therefore, if the on-vehicle processor 4 identified that the current position coordinates (Xc, Yc, Zc) of the motor vehicle M matches the global position coordinates of one of the four exit checkpoints $B_{31}, B_{32}, B_{33}$, and $B_{34}$, it means that the motor vehicle M is departing from the exit gateway $B_3$; if the processor 4 "continuously" identified that the current position coordinates (Xc, Yc, Zc) of the motor vehicle M matches the global position coordinates of two, three, or all of the four exit checkpoints $B_{31}, B_{32}, B_{33}$, and $B_{34}$, it assures the departure of the motor vehicle M from the exit gateway $B_3$. When the motor vehicle M confirmed departed from the exit gateway $B_3$, the processor 4 reads in the exit gateway ID number "$NB_3$" corresponding to the exit checkpoints $B_{31}, B_{32}, B_{33}$, and $B_{34}$ from memory device 3, and controls the GPRS module 2 to send out a short message containing the exit gateway ID number "$NB_3$" and the license number P of the motor vehicle M for log-out from the remote control center C. Upon receipt of the short message, the control center C immediately sends back a logged-out short message to activate the audio equipment 75 or video equipment 76 of the motor vehicle M, noticing the driver that the motor vehicle M has moved out of the exit gateway "$NB_3$" of the freeway S.

The aforesaid GPRS module 2 can simply send to the remote control center C a short message containing the global position coordinates of the matched entrance (exit) checkpoint and the license number P of the motor vehicle M, for enabling the server 5 of the control center C to determine which entrance (exit) gateway the global position coordinates of the matched entrance (exit) checkpoint belongs to, so as to run the log-in (log-out) operation.

Referring to FIG. 1 again, the control center C has a vehicle information database 51 that has stored therein the license numbers of different vehicles and the related vehicle information data such as kinds of vehicles, manufacturing dates of vehicles, engine numbers of vehicles, traffic violation records, names of vehicle owners, addresses of owners of vehicles, telephone numbers of owners of vehicles, credit card numbers of owners of vehicles, bank account numbers of owners of vehicles, . . . and etc. Therefore, when the motor vehicle M logged in by its license number P, the control center C can then search the vehicle information database 51 in real-time for various controls such as to track if the motor vehicle M is a stolen car or not?; to inquire the kind of the motor vehicle M so as to see if the motor vehicle M is allowed to drive in such a specific freeway or toll bridge, or not?; or simply to calculate the total number of vehicles on the freeway S for traffic volume control. The control center C can also be provided with a traveling database 53 for storing history data regarding specific roads through which specific motor vehicles M passed and the related log-in/log-out times and-locations.

This embodiment can also support an ETC (Electronic Toll Collection) system with a schedule rating database 52 in the control center C. As illustrated in FIG. 5, the schedule rating database 52 has stored therein a schedule rating table recording the toll fee from one specific entrance gateway $NA_1$, $NA_2$, $NA_3$, . . . of the freeway S to one specific exit gateway $NB_1$, $NB_2$, $NB_3$, . . . of the freeway S. The server 5 compares the schedule rating table T subject to the entrance gateway $NA_1$ of the freeway S the motor vehicle M logged in and the exit gateway $NB_3$ of the freeway S the motor vehicle M logged out, so as to find the required toll fee to be $2.0. The amount of such toll fee can be added to the traveling database 53 for accumulation. The total toll fees are calculated monthly, and then transmitted to the Transportation Bureau 61 through the Internet 6 for gathering, so that the amount due can be deducted from the credit number registered in the vehicle information database 51, or paid by a bank transfer from the account of the owner of the motor vehicle in the bank 62.

According to the aforesaid example, toll collection is based on the on-vehicle GPS position information, and automatically paid by an electronic account transfer in a financial environment background. Therefore, it is not necessary to install solid toll stations along the freeway S and solid control stations in entrance and exit gateways. Because neither solid toll stations nor control stations are necessary, the invention greatly reduces manual toll collection cost or conventional infrared electronic toll collection system installation cost, and shortens the time of building a toll collection system in a specific road.

The aforesaid schedule rating database and the related toll fee calculating can be operated in the Transportation Bureau 61 or the bank 62 instead of the control center C. Further, toll fee can be calculated through a formula F subject to the mileage (64 km=192−128) between the entrance gateway $NA_1$ and the exit gateway $NB_3$ recorded in the memory device 3 as shown in FIG. 4.

Referring to FIG. 1 again, the motor vehicle M further has installed therein a DGPS (Differential GPS) receiver 7 adapted to receive DGPS differential data from a DGPS reference station 71. DGPS reference stations 71, 72, . . . are installed in suitable locations along the freeway S, for example, the locations right around the entrance/exit gateways (see FIG. 3), or relatively farer locations where the transmitted radio signal still covers the entrance/exit gateways. DGPS differential data transmitted from DGPS reference stations 71, 72, . . . wirelessly are respectively received by the on-vehicle DGPS receiver 7, and then calculated by the on-vehicle GPS module 1 (or the processor 4) to proofread and to improve the accuracy of the current position information (Xc, Yc, Zc), minimizing the value of global position error to below one meter in a current DGPS reference station transmitting range of 10 kms. Therefore, the movement of the motor vehicle M into the entrance gateway $NA_1$ or out of the exit gateway $NB_3$ is precisely identified.

In a virtual application example of the present invention in Taiwan, the total mileage of the freeway from the north to the south is 400 kms, which is divided into three equal divisions each about 133 kms. According to current technical standards, the accuracy of the current DGPS is: 10 meters of error in the radius of 100 kms, 7.5 meters of error in the radius of 75 kms, or 5 meters of error in the radius of 50 kms. Subject to the arrangement under-mentioned, the invention can use an alternative economic method of sending the aforesaid DGPS differential data. A DGPS reference station is installed near the midpoint of each of the three divisions. Thus, every motor vehicle on the freeway is covered within the radius of 75 kms of one specific DGPS reference station. The control center C is connected to the three DGPS reference stations in Northern Taiwan, Central Taiwan and Southern Taiwan to collect the three DGPS differential data, and then to send the collected three DGPS differential data to the GPRS module 2 on every motor vehicle M by a short message or digital broadcasting, for enabling the on-vehicle processor 4 to select the respective DGPS differential data for proofread and calculation. Thus, the value of error of the global position coordinates can be minimized to below 7.5 meters. By means of the aforesaid arrangement, the number (installation density) of DGPS reference stations is reduced, resulting in low installation cost and short installation time, which is worth.

Figure 6:
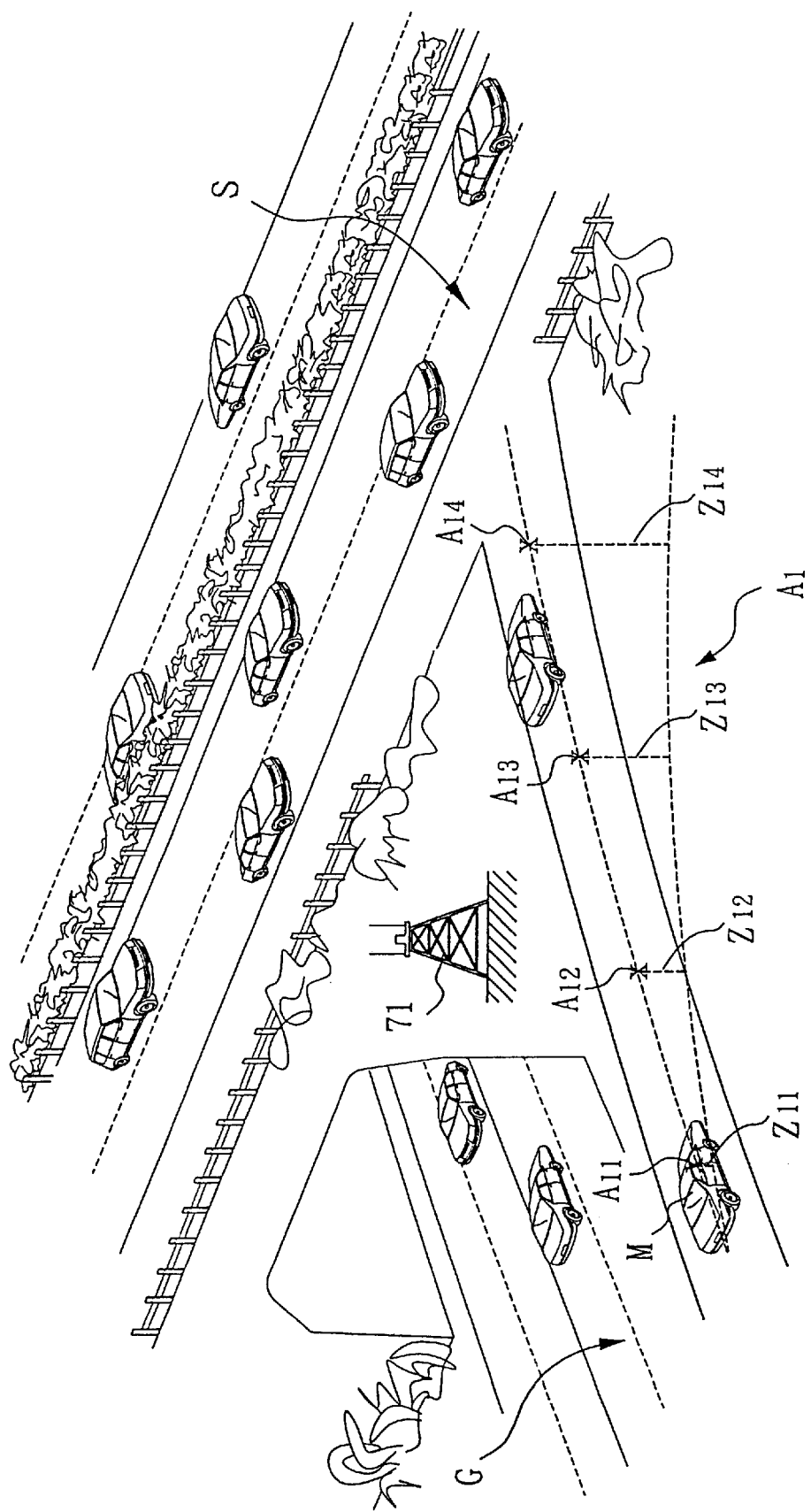
FIG. 6 is a bird's view showing the application of the preferred embodiment of the present invention in one entrance gateway of the aforesaid freeway.

Theoretically, it needs only to compare the longitudinal and latitudinal coordinates when comparing the global position coordinates of every checkpoint. However, FIG. 4 shows the invention also compares the altitude coordinate due to the existence of an altitude difference between a regular road G and the freeway S. As illustrated in FIG. 6, there is a variation of altitude among the entrance checkpoints $A_{11}$, $A_{12}$, $A_{13}$, and $A_{14}$ of the entrance gateway $NA_1$. Therefore, comparing altitude coordinate greatly improves the accuracy in identifying that the motor vehicle M has entered the entrance gateway $NA_1$ (or moved away from the exit gateway).

As shown in FIGS. 2 and 3, multiple checkpoints $C_1$, $C_2$, $C_3$, . . . are marked along the freeway S at a predetermined pitch. FIG. 4 shows the memory device 4 has stored therein the global position coordinates of the checkpoints $C_1$, $C_2$, $C_3$, ..., the related entrance ID number "$NA_1$" representing a previous entrance gateway behind the checkpoints $C_1$, $C_2$, $C_3$, ..., and the corresponding mileage data.

Therefore, when one motor vehicle M entering into entrance gateway $NA_1$ or any previous entrance gateway without logging in time due to certain reasons (on-vehicle apparatus failed or not turned on, power failure of the control center C, computer failed, ... ), the on-vehicle processor 4 uses the current position information (Xc, Yc, Zc) to compare the global position coordinates of the checkpoints $C_1$, $C_2$, $C_3$, ... stored in the memory device 3. When one or more checkpoints $C_1$, $C_2$, $C_3$, ... matched, the processor 4 reads in the previous entrance gateway ID number "$NA_1$", and sends the ID number "$NA_1$" with the license number P of the motor vehicle M to the remote control center C wirelessly for supplemented log in, preventing a mistake.

FIG. 3 shows another way to avoid mistake. According to this measure, multiple cameras 631, 632, 633 ... are installed in the entrance/exit gateways and along the freeway S, and electrically connected to the police station 63. The police station 63 uses the cameras 631, 632, 633 ... to take the pictures of passing-by motor vehicles. When the license numbers P of the motor vehicles are identified by means of an optical identification system, the police station 63 inquires the control center C of the logging status of the respective motor vehicles via the Internet 6 (see FIG. 1). If any specific motor vehicle not logged in, the police station 63 calls the control center C to send a short message to the motor vehicle to ask the driver of the motor vehicle in question to turn on the management system of the present invention. Alternatively, the police station 63 can directly issue a punishment note to fine the driver of the motor vehicle.

Although the present invention has been explained in relation to its preferred embodiment, it is to be understood that many other possible modifications and variations can be made without departing from the spirit and scope of the invention as hereinafter claimed.

What is claimed is:

1. A vehicle management system installed in a vehicle being defined with an unique identification code and to be running on at least one specific road for receiving management control by a remote control center, said at least one specific road each including at least one entrance and at least one exit, said at least one entrance each having at least one entrance checkpoint representing the corresponding entrance, said at least one entrance checkpoint each providing a global position information, said at least one exit each having at least one exit checkpoint representing the corresponding exit, said at least one exit checkpoint each providing a global position information; wherein the vehicle management system comprising:

a global positioning module adapted to compute a current position information of said vehicle;

wireless communication means;

memory means, said memory means having stored therein the global position information of said at least one entrance checkpoint and said at least one exit checkpoint; and processor means adapted to compare the current position information of said vehicle to the global position information of said at least one entrance checkpoint and to control said wireless communication means to send an entrance information representing a matched entrance checkpoint and the identification code of said vehicle wirelessly to said remote control center for log-in when the comparison matched, said processor means also being adapted to compare the current position information of said vehicle to the global position information of said at least one exit checkpoint and to control said wireless communication means to send an exit information representing a matched entrance checkpoint and the identification code of said vehicle wirelessly to said remote control center for log-out when the comparison matched.

2. The vehicle management system as claimed in claim 1, wherein said memory means further has stored therein the corresponding relationships between said at least one entrance checkpoint and said entrance information, and the corresponding relationships between said at least one exit checkpoint and said exit information.

3. The vehicle management system as claimed in claim 1 wherein said remote control center further comprises a vehicle information database, said vehicle information database having stored therein the identification codes of multiple vehicles and the related vehicle information of said multiple vehicles.

4. The vehicle management system as claimed in claim 1 wherein said remote control center further comprises a schedule rating database, said schedule rating database having stored therein a toll collection rating defining the toll fee required for driving in one of said at least one entrance and driving out of one of said at least one exit.

5. The vehicle management system as claimed in claim 4 wherein said toll collection rating is a schedule rating table.

6. The vehicle management system as claimed in claim 4 wherein said toll collection rating is a rating formula to collect a toll subject to mileage.

7. The vehicle management system as claimed in claim 1 wherein said at least one specific road each further comprises at least one checkpoint along the road each providing a global position information, said memory means further storing therein the global position information of said at least one checkpoint along the road, such that when said vehicle running on one of said at least one specific road without log-in and said processor means compared the current position information of said vehicle to be matched with one of the global position information of said at least one checkpoint along the road, said processor means controls said wireless communication means to send a previous entrance information representing a previous entrance behind the matched checkpoint along the road and the identification code of said vehicle wirelessly to said remote control center for supplemented log-in.

8. The vehicle management system as claimed in claim 7 wherein said memory means further has stored therein the corresponding relationships between said at least one checkpoint along the road and the corresponding previous entrance information.

9. The vehicle management system as claimed in claim 1 wherein the global position information of each checkpoint includes a longitude coordinate and an latitude coordinate.

10. The vehicle management system as claimed in claim 9 wherein the global position information of each checkpoint further includes an altitude coordinate.

11. The vehicle management system as claimed in claim 1 further comprising a DGPS (Differential Global Positioning System) receiver adapted to receive DGPS differential data wirelessly from a DGPS reference station.

12. The vehicle management system as claimed in claim 1 wherein said wireless communication means is capable of receiving differential global position data.

13. The vehicle management system as claimed in claim 12 wherein said differential global position data is transmitted to said wireless communication means wirelessly from said remote control center.

14. The vehicle management system as claimed in claim 12 wherein said differential global position data is DGPS differential data.

15. The vehicle management system as claimed in claim 1 wherein the identification code of said vehicle is the license number of said vehicle.

16. The vehicle management system as claimed in claim 1 wherein said entrance information is the code number of each entrance, and said exit information is the code number of each exit.

17. The vehicle management system as claimed in claim 1 wherein said specific road is a freeway.

18. The vehicle management system as claimed in claim 1 wherein said global positioning module is a GPS (global positioning system) module.

19. The vehicle management system as claimed in claim 1 wherein said wireless communication means is a GPRS (General Pack et Radio Service) module.

20. The vehicle management system as claimed in claim 1 wherein said memory means is a high-capacity IC memory card.

* * * * *